United States Patent [19]
Goda

[11] Patent Number: 5,637,024
[45] Date of Patent: Jun. 10, 1997

[54] METHOD OF COMBINING PLATE MEMBERS AND PLATE MEMBER COMBINING DEVICE FOR CARRYING OUT THE METHOD

[75] Inventor: Yoshimasa Goda, Kanagawa, Japan

[73] Assignee: Sony Corporation, Tokyo, Japan

[21] Appl. No.: 385,696

[22] Filed: Feb. 8, 1995

[30] Foreign Application Priority Data

Feb. 9, 1994 [JP] Japan .................................. 6-037863

[51] Int. Cl.⁶ .................................................... H05B 33/10
[52] U.S. Cl. ................................. 445/24; 228/212; 29/468
[58] Field of Search ............................... 29/468; 228/212; 445/24

[56] References Cited

U.S. PATENT DOCUMENTS 3,426,248  2/1969  Cistola ........................... 445/24
3,720,452  3/1973  Kupsky ........................... 445/24
5,357,668  10/1994 Roberts ........................... 29/468

*Primary Examiner*—P. Austin Bradley
*Assistant Examiner*—Jeffrey T. Knapp
*Attorney, Agent, or Firm*—Hill, Steadman & Simpson

[57] ABSTRACT

The present invention provides a simple method of combining two plate members, using an equalizing mechanism holding one of the two plate members so that the plate member is properly preloaded and can be turned by the least necessary force, and capable of combining the two plate members so that the respective contact surfaces of the plate members are joined closely and accurately. An XY-table 701 supporting a lower holding unit 5 having a holding plate 513 holding a TFT plate 11 is lifted up by a lifting table 703 to bring the TFT plate 11 into partial contact with a color filter plate 9 held by an upper holding unit 3, and then the XY-table is lifted up further to bring the respective contact surfaces 901 and 1101 of the color filter plate 9 and the TFT plate 11 into close contact with each other while the holding plate 513 is moved along a minute square path in a horizontal plane.

16 Claims, 4 Drawing Sheets

METHOD OF COMBINING PLATE MEMBERS AND PLATE MEMBER COMBINING DEVICE FOR CARRYING OUT THE METHOD

BACKGROUND OF THE INVENTION

1. Field of the Invention

The present invention relates to a method of combining two plate members together and a plate member combining device for carrying out the method.

2. Description of Related Art

A liquid crystal panel to be incorporated into a portable color television set or the like comprises pixels of a TN liquid crystal, a color filter substrate having a surface coated with red, green and blue color dot filters to enable each pixel to display a color, and TFT (thin-film transistor) substrate formed by fabricating a polycrystalline silicon TFT array by vapor deposition on a surface of a glass plate and capable of applying a voltage to each of the pixels. A process of fabricating the liquid crystal panel combines the color filter substrate and the TFT substrate.

Generally, when combining the color filter substrate and the TFT substrate, one of the substrates, for example, the color filter substrate, is held by an equalizing mechanism, such as a spherical seat mechanism, a gimbals mechanism or a gyratory mechanism, so as to be turnable about two axes perpendicularly intersecting each other, and the other plate, for example, the TFT substrate, is held stationarily and, for example, the color filter substrate is moved toward the TFT plate. When the force applied by the TFT substrate to the color filter plate exceeds the static friction force acting between the turning components of the equalizing mechanism, the color filter substrate is turned about the two axes, so that surface of the color filter substrate is aligned with the corresponding surface of the TFT sybstrate and the color filter substrate and the TFT substrate are combined accurately absorbing irregularities in the respective flatnesses and thicknesses of the glass plates of the color filter substrate and the TFT substrates, and a silicon substrate.

Generally, irregularities in flatness and thickness of the glass plates of the color filter substrate and the TFT substrate, and the silicon substrate are very small values on the order of several micrometers and hence it is desirable that the turning members of the equalizing mechanism can be turned by a very small force. However, each turning member of the equalizing mechanism cannot be turned unless a force exceeding the static friction force acting on the turning member is applied to the turning member even if the equalizing mechanism is a gyratory mechanism comprising turning members which can be turned by a comparatively small force. For example, when the turning components of the equalizing mechanism are supported in ball bearings, the respective sphericities of the balls of the ball bearings and the concentricity of the corresponding ball bearings must be improved to the highest possible extent to reduce the force capable of turning the turning components of the equalizing mechanism to the least possible extent. On the other hand, if the static friction force acting on the turning components of the equalizing mechanism is reduced substantially to the dynamic friction force, the turning members holding the plate are not preloaded and hence the plate cannot be stably supported and, consequently, the two plates cannot be combined accurately.

Accordingly, the method of holding the plate has a serious problem that it is very difficult to select parts that produce static friction forces, such as bearings, satisfying two requirements which are contradictory to each other, i.e., preloading the turning members supporting the plate to some extent and enabling the same turning members to be turned by the least possible forces. Furthermore, the variation of the static friction force attributable to abrasion must be continuously monitored and the maintenance of the equalizing mechanism including replacing the abraded component parts must be conducted so that the static friction force may not change.

SUMMARY OF THE INVENTION

The present invention has been made in view of the foregoing problems in the plate member combining method an the plate member combining device and it is therefore an object of the present invention to provide a simple method of combining two plate members using an equalizing mechanism, and capable of preloading the plate member held by the equalizing mechanism to some extent, of turning the plate member by the least possible force and of accurately combining the plate members, and a plate member combining device for carrying out the method.

With the foregoing object in view, the present invention provides a method of combining a first plate member and a second plate member, comprising steps of: holding the first plate member so as to be able to be turned about two axes perpendicularly intersecting each other; moving either the first plate member or the stationarily held second plate member so that the first plate member and the second plate member approach each other while the first plate member is moved in a minute range; and combining the first plate member and the second plate member while the first plate member is being turned about the two axes by a force applied thereto by the second plate member.

The present invention provides further a plate member combining device comprising: a first holding means for holding a first plate member for turning about a first axis and a second axis perpendicularly intersecting the first axis; a second holding means for stationarily holding a second plate member; a lifting means for lifting up either the first holding means or the second holding means so that the first holding means and the second holding means approach each other; and a driving means for driving the first holding means for movement in a minute range.

The first holding means may comprises an outer support frame, an inner support frame disposed inside the outer support frame and supported for turning about the first axis on the outer support frame, and a holding plate for holding the first plate member, disposed inside the inner support frame and supported for turning about the second axis on the inner support frame. The support frame may be mounted on an XY-table, and the driving means may be capable of driving the XY-table for movement in a plane in two directions perpendicular to each other. The lifting means may be connected to the XY-table. The driving means may be a vibration generator connected to the outer support frame, the inner support frame or the holding plate.

The first plate member is moved in the very narrow range when either the first plate member held for turning about the first axis and the second axis perpendicularly intersecting the first axis on the first holding means, such as an equalizing mechanism, or the second plate member stationarily held on the second holding means is moved so that the first plate member and the second plate member approach each other, to reduce the static friction force acting against the turning of the first plate member about the first axis and the second axis, so that the first plate member can be readily turned about the first axis and the second axis by the force applied thereto by the second plate member after the first plate member has been brought into contact with the second plate member, and the first plate member and the second plate member can be accurately combined.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

A plate member combining device 1 in a preferred embodiment according to the present invention will be described as applied to combining a color filter plate 9 (second plate member) and a TFT plate 11 (first plate member) forming a liquid crystal screen for a portable color television set.

Figure 1:
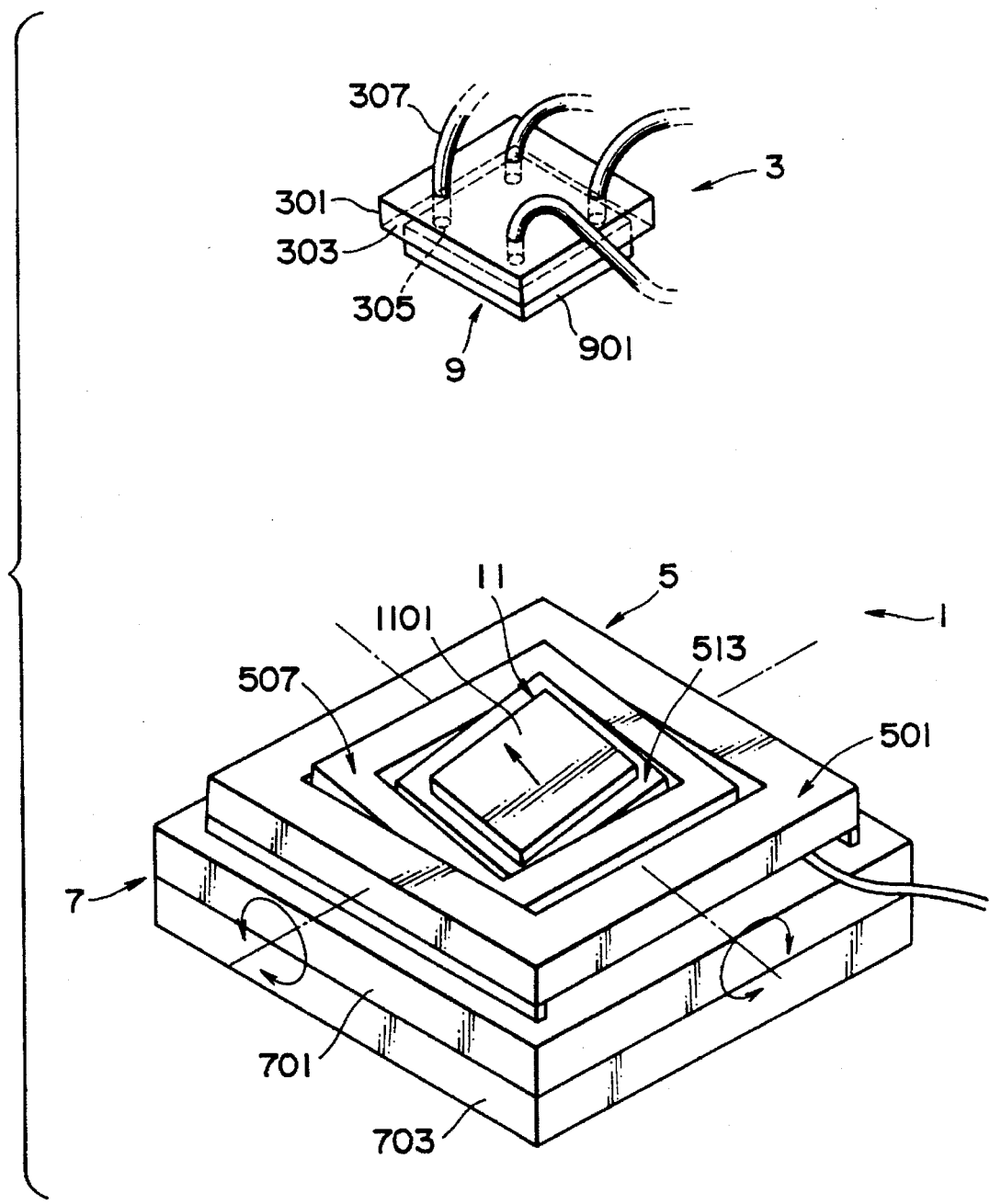
FIG. 1 is a typical perspective view of an essential portion of a plate member combining device in a preferred embodiment according to the present invention.

Referring to FIG. 1, the plate member combining device 1 comprises a stationary upper holding unit 3 (second holding means), a lower holding unit 5 (first holding means) disposed under the upper holding unit 3, and a moving mechanism 7 supporting the lower holding unit 5 for vertical and horizontal movements. The plate member combining device 1 combines the color filter plate 9 and the TFT plate 11 so that the contact surface 901 of the color filter plate 9 and the contact surface 1101 of the TFT plate are in accurate, close contact with each other.

The upper holding unit 3 has a flat upper holding plate 301 provided in the four corners of its holding surface 303 with suction holes 305 respectively connected to a vacuum source, not shown, such as a vacuum pump, with tubes 307.

The color filter plate 9 is put on the upper holding unit 3 with the back surface 903 thereof opposite the contact surface 901 in close contact with the holding surface 303 of the upper holding plate 301 so that the suction holes 305 are covered with the color filter plate 9, and then the vacuum source is operated to attract the color filter plate 9 to the holding surface 303 by suction to hold the color filter plate 9 on the holding plate 301.

Figure 2:
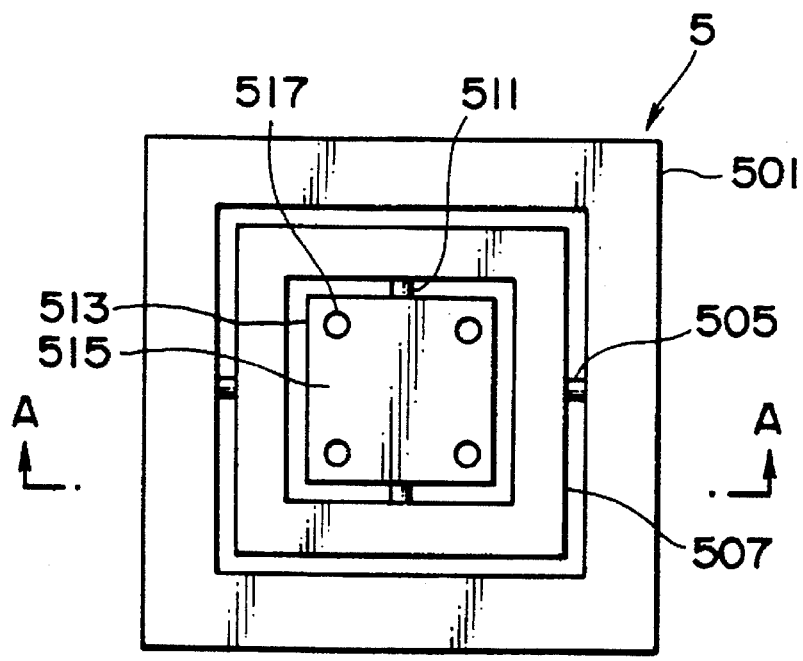
FIG. 2 is a plan view of a lower holding unit included in the plate member combining device of FIG. 1.
Figure 3:
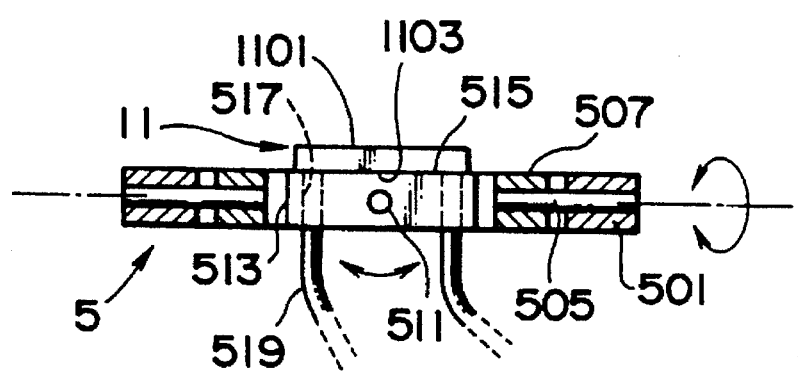
FIG. 3 is a sectional view taken on line A—A in FIG. 2.

As shown in FIGS. 2 and 3, the lower holding unit 5 comprises a rectangular outer support frame 501, a pair of support pins 505 projecting inward from the inner surfaces of a pair of opposite side members 503 of the outer support frame 501, respectively, and having a horizontal common axis, an inner support frame 507 disposed inside the outer support frame 501 and supported for turning on the support pins 505, a pair of support pins 511 projecting inward from the inner surfaces of a pair of opposite frame members of the inner support frame 507, respectively, and having a horizontal common axis perpendicular to the common axis of the support pins 505, and a flat lower holding plate 513 supported for turning on the support pins 511. The lower holding plate 513, similarly to the upper holding plate 301 of the upper holding unit 3, is provided in the four corners of its holding surface 515 with suction holes 517 respectively connected with tubes 519 to the vacuum source. The TFT plate 11 is put on the lower holding unit 5 with its back surface 1103 opposite the contact surface 1101 in close contact with the holding surface 515 so that the suction holes 517 are covered with the TFT plate 11, and then the vacuum source is operated to attract the TFT plate 11 by suction to the holding surface 515 so that the TFT plate 11 is held on the lower holding unit 5.

The moving mechanism 7 comprises an XY-table 701 supporting the outer support frame 501, and a lifting table 703 supporting the XY-table 701 for movement in two directions perpendicular to each other. A horizontal driving mechanism (driving means), not shown, provided with linear motors or the like is connected to the XY-table 701 to drive the XY-table 701 for movement in the two directions perpendicular to each other. A vertical driving mechanism (lifting means), not shown, is connected to the lifting table 703 to drive the lifting table 703 for vertical movement toward and away from the upper holding unit 3.

Figure 4:
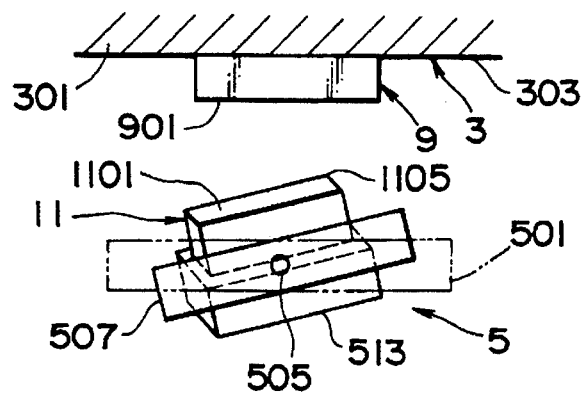
FIG. 4 is a typical side view of the plate member combining device of assistance in explaining a step of a plate member combining process to be carried out by the plate member combining device of FIG. 1 to combine a color filter plate and a TFT plate.
Figure 5:
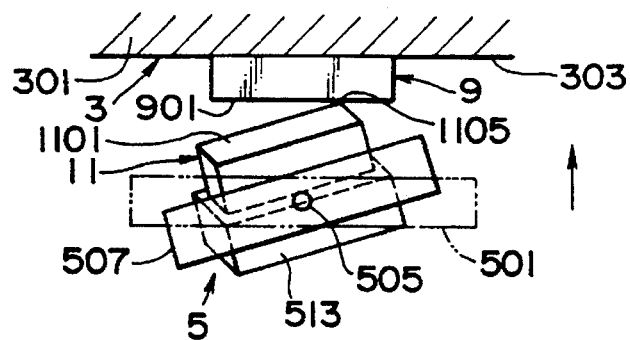
FIG. 5 is a typical side view of the plate member combining device of FIG. 1 of assistance in explaining a step of the plate member combining process to be carried out by the plate member combining device of FIG. 1 to combine the color filter plate and the TFT plate.
Figure 6:
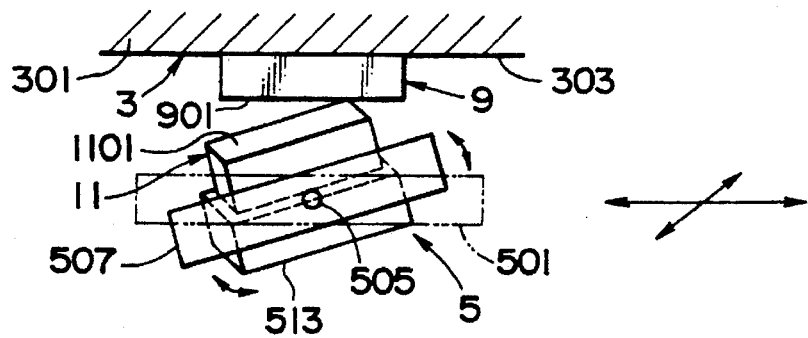
FIG. 6 is a typical side view of the plate member combining device of FIG. 1 of assistance in explaining a step of the plate member combining process to be carried out by the plate member combining device of FIG. 1 to combine the color filter substrate and the TFT substrate.
Figure 7:
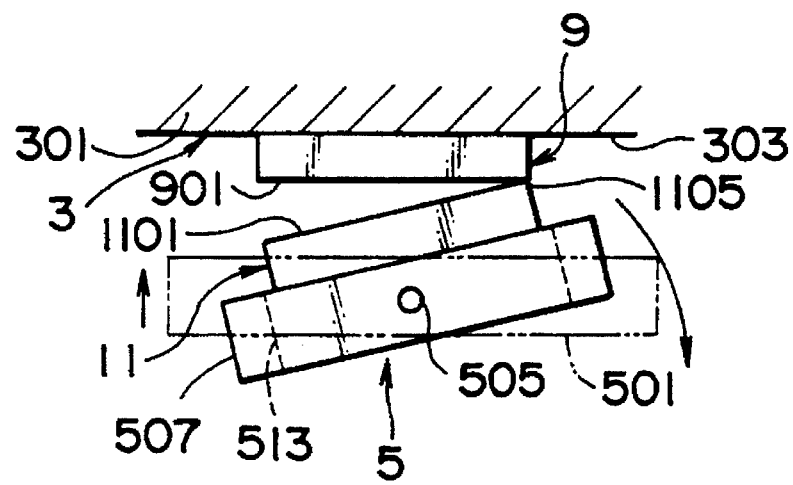
FIG. 7 is a typical side view of the plate member combining device of FIG. 1 of assistance in explaining a step of the plate member combining process to be carried out by the plate member combining device of FIG. 1 to combine the color filter substrate and the TFT substrate.
Figure 8:
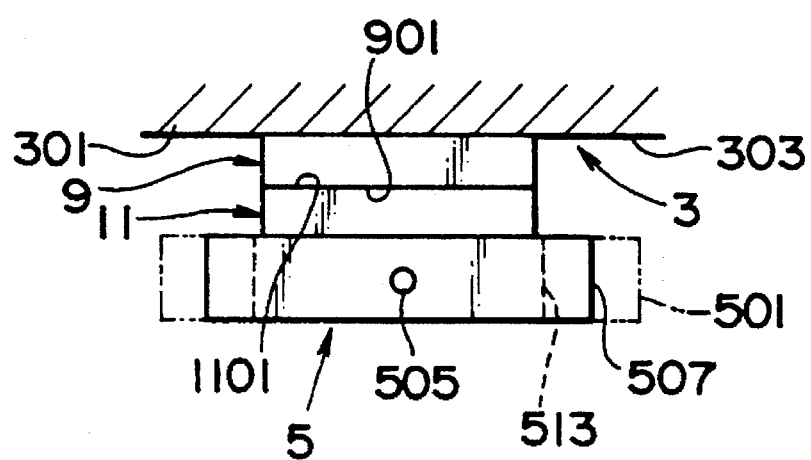
FIG. 8 is a typical side view of the plate member combining device of FIG. 1 of assistance in explaining a step of the plate member combining process to be carried out by the plate member combining device of FIG. 1 to combine the color filter substrate and the TFT substrate.

A process using the plate member combining device 1 for combining the color filter plate 9 and the TFT plate 11 will be described hereinafter. Referring to FIG. 4, the upper holding unit 3 and the lower holding unit 5 are separated vertically, the color filter plate 9 is put on the upper holding unit 3, the TFT plate 11 is put on the lower holding unit 5, and then the lifting table 703 is lifted up to move the TFT plate 11 toward the contact surface 901 of the color filter plate 9. While the TFT plate 11 is being moved toward the contact surface 901 of the color filter plate 9, the contact surface 1101 of the TFT plate 11 is not parallel to the contact surface 901 of the color filter plate 9, but the contact surface 1101 is inclined to the contact surface 901 so that a corner 1105 of the contact surface 1101 is nearest to the contact surface 901. After the TFT plate 11 has been moved to a position close to the contact surface 901 or after the corner 1105 of the TFT plate 11 has been brought into contact with the contact surface 901 as shown in FIG. 5, the XY-table 701 is driven so as to move along, for example, a minute square path. Consequently, the lower holding plate 513 is turned in a minute range on the support pins 505 and 511 as shown in FIG. 6, so that the static friction force acting on the lower holding plate 513 is reduced. Then, as the lifting table 703 is lifted up further, the lower holding plate 513 is turned on the support pins 505 and 511 by the force applied to the TFT plate 11 by the color filter plate 9 so that the contact surface 1101 of the TFT plate 11 is brought gradually into contact with the contact surface 901 of the color filter plate 9 as shown in FIG. 7. The lifting table 703 is lifted up further to bring the contact surface 1101 of the TFT plate 11 in close contact with the contact surface 901 of the color filter plate 9 as shown in FIG. 8.

The movement of the XY-table 701 in the minute range during the process of combining the color filter plate 9 and the TFT plate 11 reduces the static friction force acting against the turning of the lower holding plate 513 on the support pins 505 and 511. Accordingly, when the XY table 701 is moved in the minute range while the lifting table 703 is being lifted up, the TFT plate 11 can be turned on the support pins 505 and 511 only by a small force applied thereto by the color filter plate 9 and exceeding the reduced static friction force, and a comparatively large force exceeding the static friction force, which acts against the turning of the TFT plate 11 when the color filter plate 9 and the TFT plate 11 are combined by the conventional plate member combining method, need not be applied to the TFT plate 11 by the color filter plate 9.

Accordingly, the precise determination of the static friction force acting against the turning of the TFT plate 11 on the support pins 505 and 511 so that the TFT plate 11 can be turned by the least possible force and the TFT plate 11 may not shake is unnecessary and the static friction force may be roughly determined.

Consequently, the parts of the plate member combining device 1, such as bearings, not shown, supporting the support pins 505 and 511, can be easily selected, and work for continuously monitoring the variation of the static friction force due to the abrasion of the parts, such as the bearings, and maintenance work for frequently replacing the abraded parts can be saved.

Although the XY-table 701 of this embodiment is moved along the square path in a horizontal plane, the lower holding unit 5 may be moved in a minute range by any suitable method. For example, the lower holding unit 5 may be moved in a minute range by moving the XY-table 701 back and force and side to side with respect to a given reference position.

The lower holding unit 5 may be vibrated in a minute range to reduce the static friction force acting against the turning of the lower holding plate 513 on the support pins 505 and 511 by operatively connecting a vibration generator to the outer support frame 501, the inner support frame 507 or the lower holding plate 513.

The present invention is not limited in its practical application to the plate member combining device 1 specifically described herein; for example, the number of the suction holes 305 of the upper holding plate 301 of the upper holding unit 3 and that of the suction holes 517 of the lower holding plate 513 of the lower holding unit 5 may be greater than or smaller than four, the color filter plate 9 and the TFT plate 11 may be held on the upper holding plate 301 and the lower holding plate 513 with gripping mechanisms, such as chucks, respectively, only the upper holding unit 3 or the lower holding unit 5 may be provided with moving means to move either the color filter plate 9 or the TFT plate 11 toward the other or both the upper holding unit 3 and the lower holding unit 5 may be provided with moving means to move both the color filter plate 9 and the TFT plate 11 toward each other.

Although the present invention has been described as applied to combining the color filter plate 9 and the TFT plate 11 of a liquid crystal screen, naturally, the present invention is applicable to combining plate members other than the color filter plate 9 and the TFT plate 11.

Although the invention has been described in its preferred form with a certain degree of particularity, obviously many changes and variations are possible therein.

It is therefore to be understood that the present invention may be practiced otherwise than as specifically described herein without departing from the scope and spirit thereof.

What is claimed is:

1. A method of combining a first plate member and a second plate member, said method comprising steps of: holding the first plate member so as to be able to be turned about two axes perpendicularly intersecting each other; restricting rotary movement of said second plate member; moving either the first plate member or the second plate member toward the second plate member or the first plate member, respectively, while additionally, continuously moving the first plate member in a minute range; and combining the first plate member and the second plate member while the first plate member is being turned about the two axes by a force applied thereto by the second plate member.

2. A method of combining a first plate member and a second plate member according to claim 1, wherein the first plate member is an active matrix substrate, and the second plate member is a color filter substrate.

3. The method according to claim 1, wherein said step of continuously moving the first plate member in a minute range is further defined in that said first plate member is driven in at least one of two perpendicular directions repeatedly.

4. A method of combining a first plate member and a second plate member according to claim 3, wherein the first plate member is an active matrix substrate, and the second plate member is a color filter substrate.

5. The method according to claim 1, wherein said step of continuously moving the first plate member in a minute range is further defined in that said first plate member is moved along a square path repeatedly.

6. A method of combining a first plate member and a second plate member according to claim 5, wherein the first plate member is an active matrix substrate, and the second plate member is a color filter substrate.

7. The method according to claim 1, wherein said step of continuously moving the first plate member in a minute range is further defined in that said first plate member is vibrated.

8. A method of combining a first plate member and a second plate member according to claim 7, wherein the first plate member is an active matrix substrate, and the second plate member is a color filter substrate.

9. A method of combining a first plate member and a second plate member according to claim 8, wherein the first plate member is an active matrix substrate, and the second plate member is a color filter substrate.

10. A method of flushly abutting a first plate member and a second plate member, comprising the steps of:

providing a first support structure for holding said first plate member and a second support structure for holding said second plate member;

providing that said first support structure and said second support structure are movable toward and away from each other to bring said first plate against said second plate;

providing that said first support structure includes a first plate support surface and a frame, said support surface operatively connected to said frame to be pivotable about two perpendicular axes allowing said first plate to conform to said plane of said second plate when said first and second plates are abutted;

moving said first support structure toward said second support structure and abutting said first plate to said second plate; and while abutting said first plate to said second plate continuously moving said frame in a minute range.

11. The method according to claim 10, wherein said step of moving in a minute range is further defined in that said frame is vibrated.

12. The method according to claim 10, wherein said step of moving in a minute range if further defined as moving said frame in a square pattern.

13. The method according to claim 10, wherein said step of moving in a minute range comprises moving said frame back and forth along at least one of said axes.

14. The method according to claim 10, wherein said step of moving in a minute range comprises moving said frame back and forth along both axes.

15. The method accordingly to claim 10, wherein said first plate member is an active matrix substrate, and second plate member is a color filter substrate.

16. The method according to claim 10, wherein said second support structure prevents rotation of said second plate.

* * * * *